US011223869B2

(12) United States Patent
Mehta et al.

(10) Patent No.: US 11,223,869 B2
(45) Date of Patent: Jan. 11, 2022

(54) CONTENT STREAM MULTICASTING WITH RELATIVE LATENCY FOR MEDIA DEVICES

(71) Applicant: Verizon Patent and Licensing Inc., Arlington, VA (US)

(72) Inventors: Neil S. Mehta, East Hanover, NJ (US); Arvind Basra, Glen Ridge, NJ (US); Rohit Sharma, White Plains, NY (US); Yuk Lun Li, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 16/653,453

(22) Filed: Oct. 15, 2019

(65) Prior Publication Data
US 2021/0112296 A1 Apr. 15, 2021

(51) Int. Cl.
*H04N 21/262* (2011.01)
*H04N 21/239* (2011.01)
*H04L 29/06* (2006.01)
*H04N 21/24* (2011.01)
*H04N 21/6405* (2011.01)
*H04N 21/442* (2011.01)

(52) U.S. Cl.
CPC ........ *H04N 21/2625* (2013.01); *H04L 65/80* (2013.01); *H04N 21/2393* (2013.01); *H04N 21/2402* (2013.01); *H04N 21/44209* (2013.01); *H04N 21/6405* (2013.01)

(58) Field of Classification Search
CPC ......... H04N 21/2662; H04N 21/44209; H04N 21/4621; H04N 21/2393; H04N 21/437; H04N 21/2402; H04N 21/6405; H04N 21/25891; H04N 21/239; H04N 21/26208; H04N 21/4316; H04N 21/4788; H04N 21/4882; H04N 21/251; H04N 21/235; H04N 21/25866; H04N 21/435; H04N 21/4532; H04N 21/4668; H04L 65/80
See application file for complete search history.

(56) References Cited

U.S. PATENT DOCUMENTS

| 8,392,583 | B2 * | 3/2013 | Bijwaard | ............ | H04L 65/4084 |
| | | | | | 709/227 |
| 2012/0195313 | A1 * | 8/2012 | White | .............. | H04N 21/23406 |
| | | | | | 370/390 |

(Continued)

*Primary Examiner* — Nathan J Flynn
*Assistant Examiner* — Christine A Kurien

(57) ABSTRACT

A stream management platform may receive a request to provide, via a network, a content stream to an area, wherein the request indicates a requested latency associated with providing the content stream to the area. The stream management platform may determine an entry node of the network that is to receive the content stream from a content source. The stream management platform may identify a plurality of transmission nodes associated with the area. The stream management platform may determine respective latencies associated with multicasting the content stream from the entry node to the plurality of transmission nodes. The stream management platform may determine whether the respective latencies satisfy the requested latency. The stream management platform may perform, based on whether the respective latencies satisfy the requested latency, an action associated with the content stream according to the respective latencies.

20 Claims, 8 Drawing Sheets

(56) References Cited

U.S. PATENT DOCUMENTS

2017/0232340 A1\* 8/2017 Lockton .............. G07F 17/3227
 463/42
2019/0158606 A1\* 5/2019 Guim Bernat .......... H04W 4/40
2019/0182305 A1\* 6/2019 Shen ................ H04N 21/23106
2020/0413111 A1\* 12/2020 Varadarajan ....... H04N 21/2393

\* cited by examiner

CONTENT STREAM MULTICASTING WITH RELATIVE LATENCY FOR MEDIA DEVICES

BACKGROUND

Streaming content (or media) (e.g., video streaming) involves delivering content and continually presenting the content to an end-user (e.g., via a media device). A content stream can include a live stream, a look-up stream, and/or the like. In a live stream, content is provided to a media device without saving the content (e.g., using memory resources). In a look-up stream, content can be saved and/or buffered (e.g., temporarily stored) in a look-up storage prior to being provided to a media device.

DETAILED DESCRIPTION OF PREFERRED EMBODIMENTS

Figure 1A:
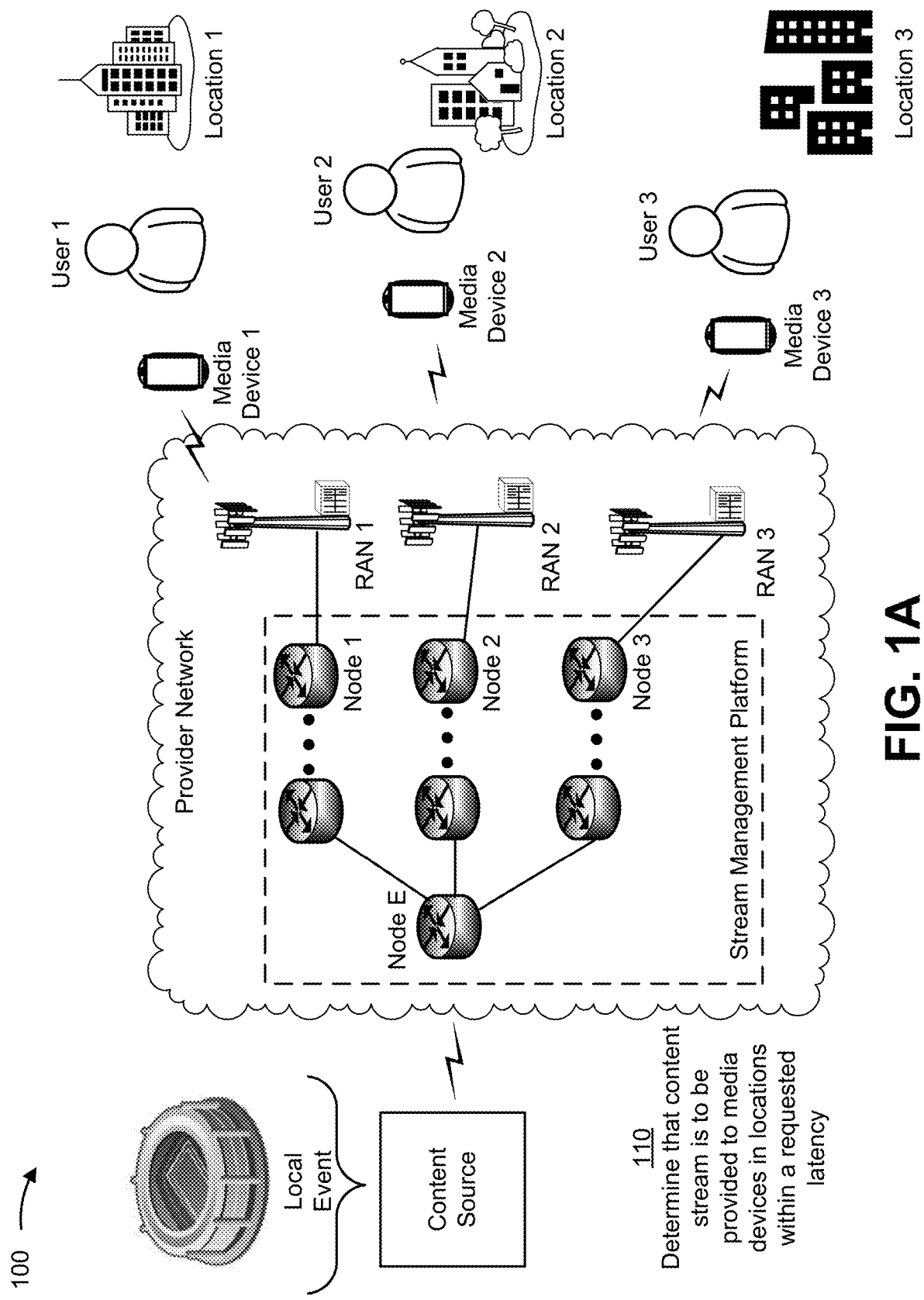
FIGS. 1A-1D are diagrams of an example implementation described herein.

The following detailed description of example implementations refers to the accompanying drawings. The same reference numbers in different drawings may identify the same or similar elements.

Content streams may be configured to be provided, via a network, to a plurality of media devices (e.g., user devices, such as user equipment, smartphones, televisions, set-top boxes, and/or the like). Such content streams may be associated with a live event (e.g., a professional sporting event, a concert, a newscast, and/or the like). In such cases, due to certain characteristics of the network, the same content (e.g., the same audio, the same video, the same image, and/or the like) associated with a live event may reach the plurality of media devices at different times. Such characteristics may include available bandwidth of network devices (e.g., gateways, routers, base stations, and/or the like), transmission capabilities (e.g., broadcast capabilities, multicast capabilities, unicast capabilities, and/or the like), and/or physical characteristics (e.g., distances between the source of the content stream and the media devices, distances between network devices of a routing path between the source and the media devices, and/or the like).

Multiple media devices receiving the same content of a content stream at different times can cause an undesirable user experience. For example, if a user is viewing a sporting event on a media device, it can be undesirable for that user to be notified of an updated score of the sporting event based on information from another media device (e.g., due to overhearing audio from the other media device, due to another user indicating the update to the score or cheering, and/or the like). Previous techniques may involve broadcasting the content stream to a particular area so that media devices are accessing the same content stream. However, broadcasting the content stream to only a single area may waste resources required for the broadcast (e.g., because fixed resources are allotted to provide the content to the area regardless of the quantity of media devices accessing the content stream).

According to some implementations described herein, a stream management platform may be configured to manage multicasting a content stream to one or more media devices of an area to permit the media devices to receive the content stream with relative latency. For example, the stream management platform may determine a requested latency for providing a content stream to an area, determine that the content stream can be multicast to the area within the requested latency, and provision a network to multicast the content stream to the area to cause media devices in the area to receive same content of the content stream within a same time period that has a threshold duration. In this way, the stream management platform may conserve resources (e.g., computing resources and/or network resources) of the network relative to broadcasting the content stream to the area. Furthermore, the stream management platform may enhance a user experience associated with a media device of a user receiving the same content of a content stream within a same time period as other media devices in the area of the user and/or the media device.

In some implementations, a stream management platform may be associated with a multi-access edge computing (MEC) computing environment. In a MEC environment, computing is enabled by a network architecture that provides computing capabilities to an endpoint (e.g., a "media device" as described herein), via computing platforms at or near an edge of a network (e.g., a wireless communication network, such as a cellular network). Because a MEC environment can provide computing at or near the edge of the network (e.g., physically or topologically toward endpoints served by the network), increased performance may be achieved over network architectures that provide computing from a core of the network, which may be located topologically and/or physically further from the endpoint than a MEC environment. Such increased performance may be achieved in the MEC environment, over other network architectures, due to less traffic and/or congestion between the endpoint and the computing platform, less latency (due to the closer proximity), increased flexibility (due to a greater amount of computing platforms), and/or the like. In this way, the stream management platform may be positioned nearer (e.g., physically closer and/or logically closer within a network) to one or more multicast repeaters of the network and/or one or more media devices that are to receive the content stream. Accordingly, the stream management platform may be configured to more accurately determine the latencies of routing paths for multicasting the content stream between an entry node of the network (e.g., a node of the network that is nearest a content source of the content stream) and transmission nodes of the area.

FIGS. 1A-1D are diagrams of an example implementation 100 described herein. Example implementation 100 includes a stream management platform, a content source, a provider network, and a plurality of media devices (referred to herein individually as "Media Device 1," "Media Device 2," or "Media Device 3" and collectively as "media devices") at various locations (shown as "Location 1," "Location 2," and "Location 3" and referred to collectively as the "locations"). The provider network may include a plurality of network devices, shown as a plurality of network nodes (including nodes "Node E," "Node 1," "Node 2," and "Node 3") and a plurality of radio access networks (RANs) ("RAN 1," "RAN 2," "RAN 3"). In example implementation 100, Media Device 1 is within communication range of a base station of RAN 1 when at Location 1 (e.g., within an area associated Location 1), Media Device 2 is within communication range of a base station of RAN 2 when at Location 2, and Media Device 3 is within communication range of a base station of RAN 3 when at Location 3.

As described in connection with example implementation 100, the locations may be considered to be within a same area of interest that is to receive a content stream from the content source within a requested latency. For example, Location 1, Location 2, and Location 3 may be associated with different towns within a same state. In another example, Location 1, Location 2, and Location 3 may be associated with different states of a same country. As described herein, the stream management platform may determine whether the provider network is capable of providing the content stream to the locations within a requested latency and/or provisioning the provider network to provide the content stream to the locations such that the media devices receive the same content of the content stream with relative latency (e.g., within a same time period).

As shown in FIG. 1A, and by reference number 110, the stream management platform may determine that a content stream is to be provided to media devices in the locations within a requested latency. For example, the stream management platform may receive a request to determine whether the provider network is capable of providing content of the content stream to the media devices within a requested latency. The request may be received from the content source, which may be associated with a particular entity (e.g., a media company, an entertainment company, a news organization, and/or the like). As an example, during a planning phase, the entity may request the stream management platform to indicate whether the provider network can provide the content stream to an area that includes the locations within a same requested latency. Furthermore, as described herein, the entity may request the stream management platform to indicate whether the provider network can provide the content stream to the area within a requested relative latency corresponding to media devices at the locations receiving a same set of content of the content stream within a same threshold time period (e.g., relative to the time of transmission from the content source).

The content source may include one or more devices that are capable of providing a content stream that includes content that is accessible (e.g., visible, audible, and/or the like) to the media devices. For example, as shown, the content source may capture (e.g., using a camera, a microphone, a user interface, a sensor, and/or the like) content associated with a local event (e.g., a sporting event, a concert, a newscast, and/or the like). Additionally, or alternatively, the content source may include one or more content editors and/or content stream generators that create the content stream from content data received from one or more content capture devices (e.g., capture devices at the local event), that embeds metadata with the content data (e.g., information associated with the content, such as a score of a sporting event, timing associated with the sporting event, and/or the like), and/or formats the content stream for distribution via the provider network. In some implementations, content data associated with content may be pre-recorded and/or stored before being transmitted as a live content stream (e.g., a pre-recorded newscast, a pre-recorded live television show, and/or the like). In this way, the content source may include one or more devices that are capable of receiving captured content, generating a content stream that includes the captured content, and providing the content stream to the provider network for distribution to media devices (and/or end users).

In this way, the stream management platform may determine that the content stream is to be provided, from the content source, to the locations within a requested latency, to permit the stream management platform to determine routing paths (e.g., multicast routing paths) for providing the content stream via the provider network.

Figure 1B:
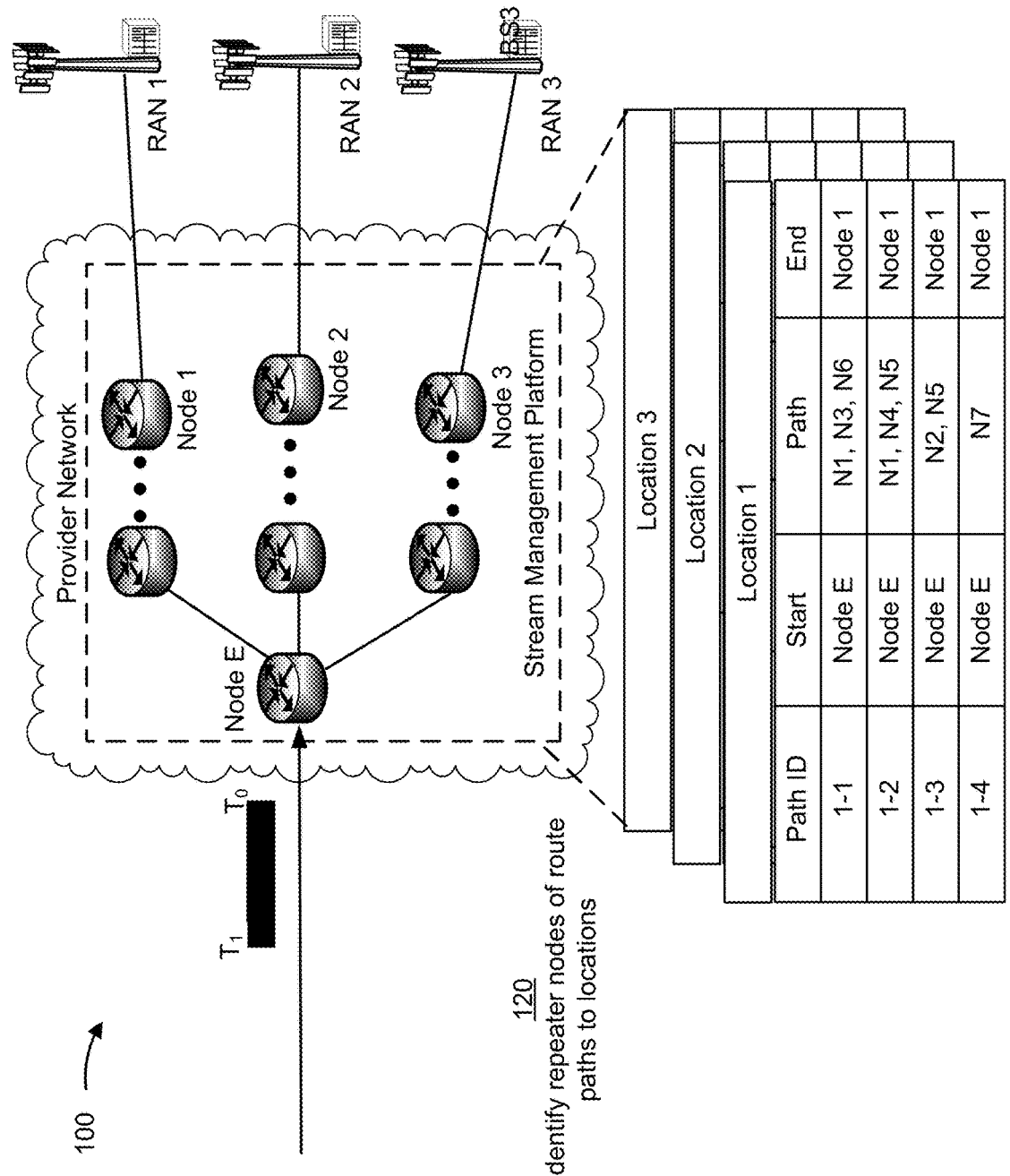

As shown in FIG. 1B, and by reference number 120, the stream management platform identifies repeater nodes of routing paths to the locations. For example, as described herein, the stream management platform may identify or determine repeater nodes of the provider network that may serve as an entry node of the provider network, one or more intermediate nodes of routing paths through the provider network, and/or one or more transmission nodes of the routing paths (e.g., nodes communicatively coupled with and/or including the base stations). In example implementation 100, the entry node is shown as the first node of the provider network that is to initially receive a portion of a content stream ("CS") that has a duration from $T_0$ to $T_1$. Though example implementation 100 is described in connection with a single entry node, the content source may provide the content stream to multiple nodes of the provider network. In such cases, there may be a plurality of entry nodes to the network.

The stream management platform may identify the entry node based on a location of the content source. For example, the content source may indicate (e.g., in a request to provide the content stream to the locations) the location (e.g., using geographical coordinates, an identifier of a location, such as a town, a zip code, a state, and/or the like) of the content source to the stream management platform. Based on identifying or determining the location of the content source, the stream management platform may identify the node of the network (Node E) that is nearest the location of the content source. Additionally, or alternatively, the stream management platform may identify the node of the network that provides the least latency from the location (e.g., regardless of physical distance or topological distance). In example implementation 100, Node E may be determined to be the entry node based on being the node that provides the least latency from the content source, being the node that is physically closest to the content source (e.g., being a shortest geographical distance from the content source), and/or being the node that is topologically nearest the content source (e.g., being the node that has the least quantity of network devices between the node and the content source). In this way, the stream management platform may identify the entry node based on the location of the content source and the location of the entry node.

Additionally, or alternatively, the stream management platform may identify transmission nodes of the provider network that are associated with the locations (e.g., transmission nodes that are capable of transmitting the content stream directly to the media devices). The transmission nodes may correspond to nodes that are at the locations and/or are within an area in which media devices are to receive a content stream with relative latency. Similar to identifying the entry nodes, the stream management platform may determine the transmission nodes based on location information (e.g., geographical coordinates, an identifier of the location, such as a town name or a zip code, and/or the like) associated with the area and location information associated with repeater nodes of the provider network. In some implementations, the transmission nodes may include and/or correspond to repeater nodes (e.g., Node 1, Node 2, and Node 3) at the edge of the provider network that are closest (e.g., physically and/or topologically) to the RANs at the locations or within the area. Additionally, or alternatively, the transmission nodes may include or correspond to base stations of the RANs.

Furthermore, the stream management platform may determine routing paths between the identified entry node and the identified transmission nodes of the area. For example, the stream management platform may determine the respective routing paths based on a topology of the provider network. As described herein, the routing path may include the entry node, one of the transmission nodes, and one or more intermediate nodes between the entry node and the transmission node.

As shown in FIG. 1B, the stream management platform may identify routing paths from the entry node to the transmission nodes by particular path identifiers ("Path ID") and determine start nodes (Node E), end nodes (Node 1 for Location 1, Node 2 for Location 2, Node 3 for Location 3), and intermediate nodes between the start nodes and end nodes. Accordingly, as shown, a routing path identified by Path ID 1-1 may flow from Node E, through repeater nodes N1, N3, N6, and end at Node 1; a routing path identified by Path ID 1-2 may flow from Node E, through repeater nodes N1, N4, N5, and end at Node 1; a routing path identified by Path ID 1-3 may flow from Node E, through repeater nodes N2, N5, and end at Node 1; and a routing path identified by Path ID 1-4 may flow from Node E, through repeater node N7, and end at Node 1.

In this way, the stream management platform may identify repeater nodes of the provider network to determine potential routing paths that may be used to provide the content stream to the area of the locations using the provider network.

Figure 1C:
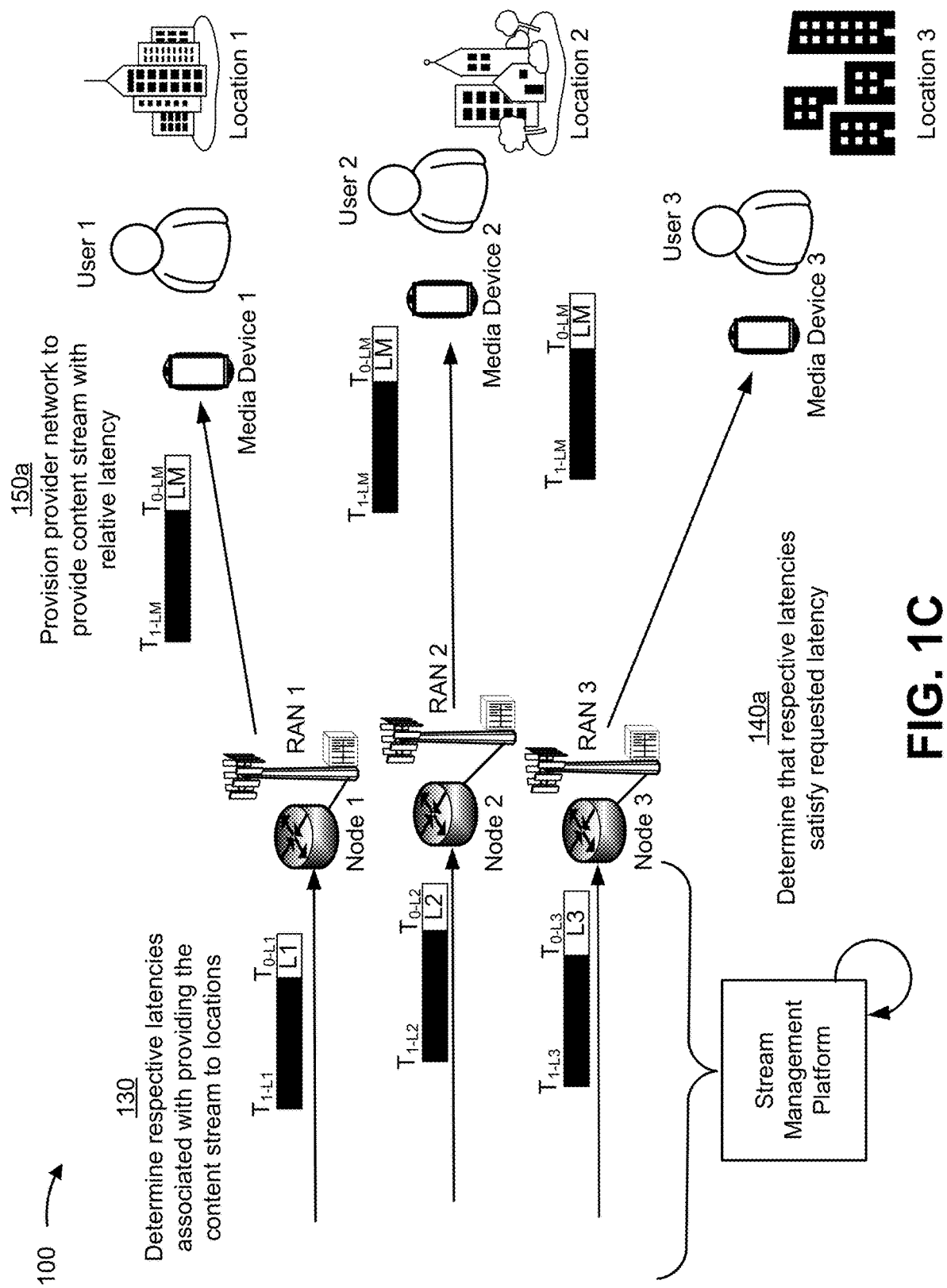

As shown in FIG. 1C, and by reference number 130, the stream management platform determines respective latencies associated with providing the content stream to the locations. As describe herein, the stream management platform may determine the respective latencies for providing the content to the locations to determine whether the respective latencies satisfy the requested latency for providing the content stream.

In some implementations, the stream management platform may determine the respective latencies for providing the content stream to the locations based on determining routing paths from the entry node to the transmission nodes. For example, the stream management platform may determine a latency associated with a routing path based on a length of the routing path. The length of the routing path may be based on a physical distance (e.g., a physical length) of the routing path and/or a quantity of nodes (and/or a quantity of segments between the nodes) (e.g., a topological length) of the routing path. Additionally, or alternatively, the stream management platform may determine or estimate a latency of a routing path based on determined available bandwidths of repeater nodes of the routing path.

In some implementations, a routing path for providing the content stream to a particular location may be selected from a plurality of routing paths. For example, the stream management platform may select a routing path of the routing paths 1-1, 1-2, 1-3, 1-4 from Node E to Node 1 that is determined and/or estimated to have the lowest latency when the content stream is to be provided. As a more specific example, assuming resources and performance characteristics for the indicated repeater nodes of the routing paths 1-1, 1-2, 1-3, 1-4 are the same, the stream management platform may determine that routing path 1-4 would provide the lowest latency because routing path 1-4 has the fewest segments, and select routing path 1-4 as the multicast route to Location 1.

In some implementations, the stream management platform may select routing paths from possible or identified routing paths of the provider network based on information provided in the request to provide the content stream. For example, the stream management platform may identify, from the request, constraints associated with providing the content stream, such as a bandwidth requirement, timing and/or duration of providing the content stream, a requested latency, a requested relative latency, and/or the like. In such cases, the stream management platform may determine routing paths for multicasting the content stream according to one or more projected conditions of the nodes of the routing paths. For example, for one or more of the possible routing paths, the stream management platform may identify, according to the timing of providing the content stream, a likely available bandwidth and/or workload of the intermediate nodes, likely performance characteristics (e.g., processing speeds, throughput, and/or the like), likely available resources, and/or the like. In such cases, the stream management platform may filter out routing paths that may not be able to satisfy a particular constraint associated with the providing the content stream. For example, the stream management platform may not consider routing paths that would not be able to satisfy a bandwidth requirement (e.g., a minimum bandwidth requirement) associated with the content stream.

According to some examples described herein, the stream management platform may determine whether the content stream can be multicast with relative latency to the locations so that the media devices can receive a same set of content (e.g., live content) of the content stream at relatively the same time (e.g., within a tolerance or threshold time period). For example, the same set of content may be multicast with relative latency to multiple devices when the multiple devices receive the same set of content from separate multicast content streams within a threshold time period that is based on the moment the set of content is transmitted from the content source. For example, the threshold time period may have a duration of one second that begins from five seconds after being transmitted from the content source. In such an example, the requested latency may correspond to six seconds (e.g., five seconds plus the one second duration of the threshold time period) and the relative latency may correspond to one second (e.g., the threshold time period within which the media devices are to receive the same content). In this way, as a more specific example, if multiple media devices are presenting a content stream associated with a sporting event, the multiple media devices, when live streaming the sporting event, may each present a same scoring event at times that may generally not be perceivably different (e.g., because of the one second tolerance) to users viewing the sporting event via the separate media devices, thus enhancing a user experience relative to previous techniques.

As shown, the stream management platform may determine (or estimate) that a first multicast of the content stream ("CS1") would be provided to Node 1 with a first latency ("L1"), a second multicast of the content stream ("CS2") would be provided to Node 2 with a second latency ("L2"), and a third multicast of the content stream ("CS3") would be provided to Node 3 with a third latency ("L3"). As mentioned above, the first latency may be the shortest latency of any determined latencies for providing the content stream to Location 1, the second latency may be the shortest latency of any determined latencies for providing the content stream to Location 2, and the third latency may be the shortest latency of any determined latencies for providing the content stream to Location 3.

In this way, the stream management platform may determine whether the respective latencies satisfy the requested latency to permit the stream management platform to perform an action associated with providing the content stream.

As further shown in FIG. 1C, and by reference number 140a, the stream management platform may determine that the respective latencies satisfy the requested latency. For example, the stream management platform may determine that each of the latencies L1, L2, and L3 satisfy a requested latency for providing the content stream when the content stream is to be received by the content source. The stream management platform may determine that the respective latencies satisfy the requested latency when the respective latencies are shorter than the requested latency (e.g., based on a comparison of each of the respective latencies to the requested latency). In some implementations, the stream management platform may determine a maximum latency of the respective latencies and compare the maximum latency with the requested latency to determine whether the respective latencies satisfy the requested latency.

According to some implementations, the stream management platform may determine that the respective latencies satisfy the requested latency based on being within a range associated with the requested latency (e.g., within 0.1 seconds of the requested latency, within 0.5 seconds of the requested latency, within 1 second of the requested latency, and/or the like). For example, in such cases, the respective latencies may correspond to expected latencies of multicasting the content stream to the locations without controlling one or more multicast repeaters of the provider network to buffer or delay a multicast stream of the content stream relative to other multicast streams of the content stream. For example, rather than buffering or delaying one or more multicast streams to ensure that the multicast streams are provided with relative latency, the stream management platform may determine whether the respective latencies would be within a range of the requested latency without any intervention. In such cases, processing resources, memory resources, and/or communication resources may be conserved because the transmission nodes and/or components of the stream management platform may not have to communicate timing associated with the respective multicast streams of the transmission nodes.

In this way, the stream management platform may determine that the respective latencies satisfy the requested latency.

As further shown in FIG. 1C, and by reference number 150a, the stream management platform provisions the provider network to provide the content stream with the relative latency. For example, the stream management platform may provision the provider network to provide the content stream between the entry node and the plurality of transmission nodes. For example, the stream management platform may configure the repeater nodes of routing paths to the locations to establish the routing paths as determined herein. In this way the stream management platform may cause the content stream to be provided and/or provide the content stream, via the provider network, to the plurality of media devices as the content stream is received from the content source.

In example implementation 100, the stream management platform may provision nodes and/or resources of routing paths used to provide the multicast streams CS1, CS2, and CS3 to the media devices at the locations with a same latency "LM" so that the media devices receive the same content of the content stream at relatively the same time. In some implementations, the latency of multicast streams CS1, CS2, and CS3 may correspond to a maximum of the respective latencies L1, L2, and L3. For example, the stream management platform may determine the maximum latency of latencies L1, L2, and L3, and configure the transmission nodes (and/or other repeater nodes of the provider network) to provide the content stream with the maximum latency. As described herein, the maximum latency is to be less than or equal to the requested latency when the respective latencies satisfy the requested latency. Accordingly, the stream management platform may provide the network to provide the content stream in association with a maximum latency of the respective latencies L1, L2, and L3.

In some implementations, prior to provisioning the network, the stream management platform may determine terms of a service level agreement. For example, the terms of the service level agreement may include a charging policy (e.g., financial costs and/or parameters for charging the financial costs), timing associated with providing the service, and/or performance parameters (e.g., maximum latency, reliability, minimum resources, data error rate, and/or the like). The terms of service may correspond to one or more parameters associated with providing the content stream as indicated in the request.

In some implementations, a charging policy that is to be included in the terms of service may be determined based on a fee schedule associated with the parameters of providing the content stream to the area. For example, such parameters of the fee schedule may include the requested latency, the determined maximum latency of the routing paths, a bandwidth requirement associated with providing the content stream, a duration associated with providing the content stream, a distance between the content source and the area, a distance between the entry node and one or more of the plurality of transmission nodes, a transmission type associated with providing the content stream from the plurality of transmission nodes, and/or the like. In some implementations, the stream management platform may provide (e.g., as a response to the request) the service level agreement to the entity (e.g., or the content source) to permit the entity to accept the service level agreement. Accordingly, if the entity accepts the terms of the service level agreement, the stream management platform may provision the provider network to provide the content stream according to the service level agreement.

According to some implementations, after the provider network begins providing the content stream to the area, the stream management platform may monitor the plurality of transmission nodes to ensure that the content stream is provided to the area with the requested relative latency. For example, the stream management platform may control the transmission nodes and/or cause the transmission nodes to coordinate with one another to transmit the same content of the content stream at relatively the same time so that the media devices receive that content at the same time (or nearly the same time) relative to each other.

In some implementations, the stream management platform may configure the provider network to provision routing paths of the provider network according to a quantity of media devices accessing (or requesting to access) the content stream. For example, if a single device, such as Media Device 1, is requesting to access the content stream, the provider network may be configured to unicast the content stream from Node E, through Node 1 and RAN 1, to Media Device 1. In such a case, the stream management platform may determine that the transmission type, during that time period, is unicast and implement a unicast charging policy for unicasting the content stream to the area. The unicast charging policy may be different from a multicast charging policy that could be applied if two or more of the media devices of example implementation 100 are accessing (or requesting to access) the content stream via the provider network. In this way, the stream management platform may monitor a transmission type of the content stream to the area (e.g., based on a quantity of media devices accessing the content stream) and store or indicate (e.g., to a charging policy device) information identifying the transmission type used to provide the content stream (and/or corresponding timing for using the transmission type) to permit a charging policy to be applied based on the transmission type.

In this way, the stream management platform may provision the provider network to provide the content stream when the respective latencies satisfy the requested latency.

Figure 1D:
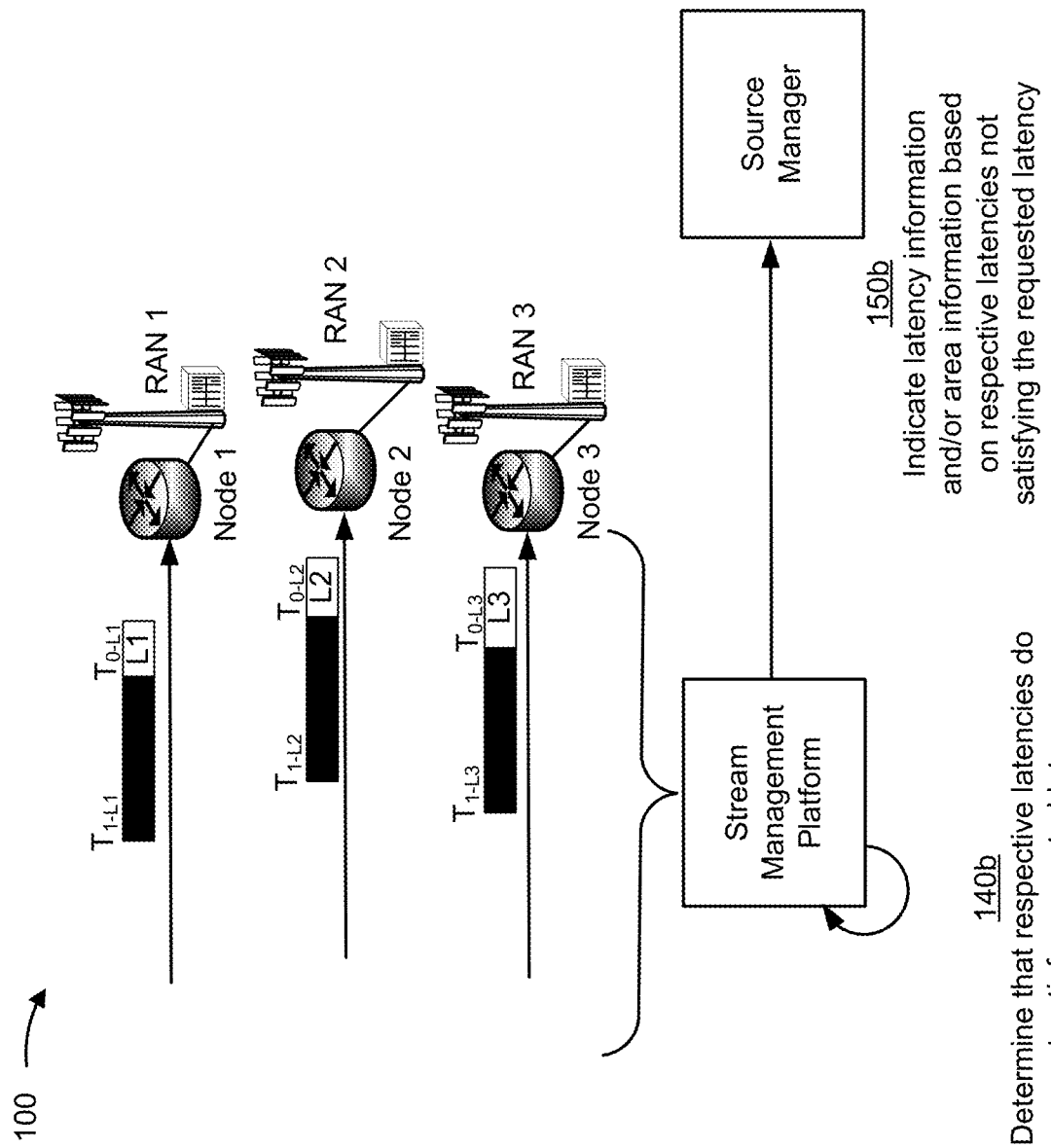

As shown in FIG. 1D, and by reference number 140*b*, the stream management platform may determine that the respective latencies do not satisfy the requested latency. For example, the stream management platform may determine that one or more of the routing paths for multicasting the content stream to one or more of the locations of the area do not satisfy the requested latency. In other words, at least one of L1, L2, or L3 may be greater than the requested latency.

In this way, the stream management platform may determine that the provider network cannot provide the content stream to the area (e.g., or all relevant locations of the area) with the requested latency.

As further shown in FIG. 1D, and by reference number 150*b*, the stream management platform indicates latency information and/or area information based on the respective latencies not satisfying the requested latency. For example, the stream management platform may provide the determined respective latencies, or a maximum latency of the respective latencies, to the content source (e.g., a device or platform associated with the content source). Additionally, or alternatively, the stream management platform may provide serviceable area information that would meet the requested latency. For example, the stream management platform may determine a serviceable area or locations of a serviceable area that is/are nearer the content source that would enable routing paths to be provisioned that meet the requested latency. In this way, an entity associated with the content source may determine whether to approve provisioning the provider network to provide the content stream at the determined latencies or to provide the content stream to a determined area at the requested latency. In some implementations, the stream management platform may provide terms of a service level agreement associated with the latency information and/or the serviceable area information. For example, in a similar manner as described above in connection with determining and/or providing a service level agreement according to providing the content stream to the requested area with the requested latency, the stream management platform may determine and/or provide a service level agreement associated with parameters for providing the content stream according to the determined latency for the requested area or parameters for providing the content stream to the determined area with the requested latency.

In this way, the stream management platform may provide the latency information and/or serviceable area information to permit an entity to authorize providing the content stream according to the latency information and/or the serviceable area information.

The number and arrangement of devices and networks shown in FIGS. 1A-1D are provided as one or more examples. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2:
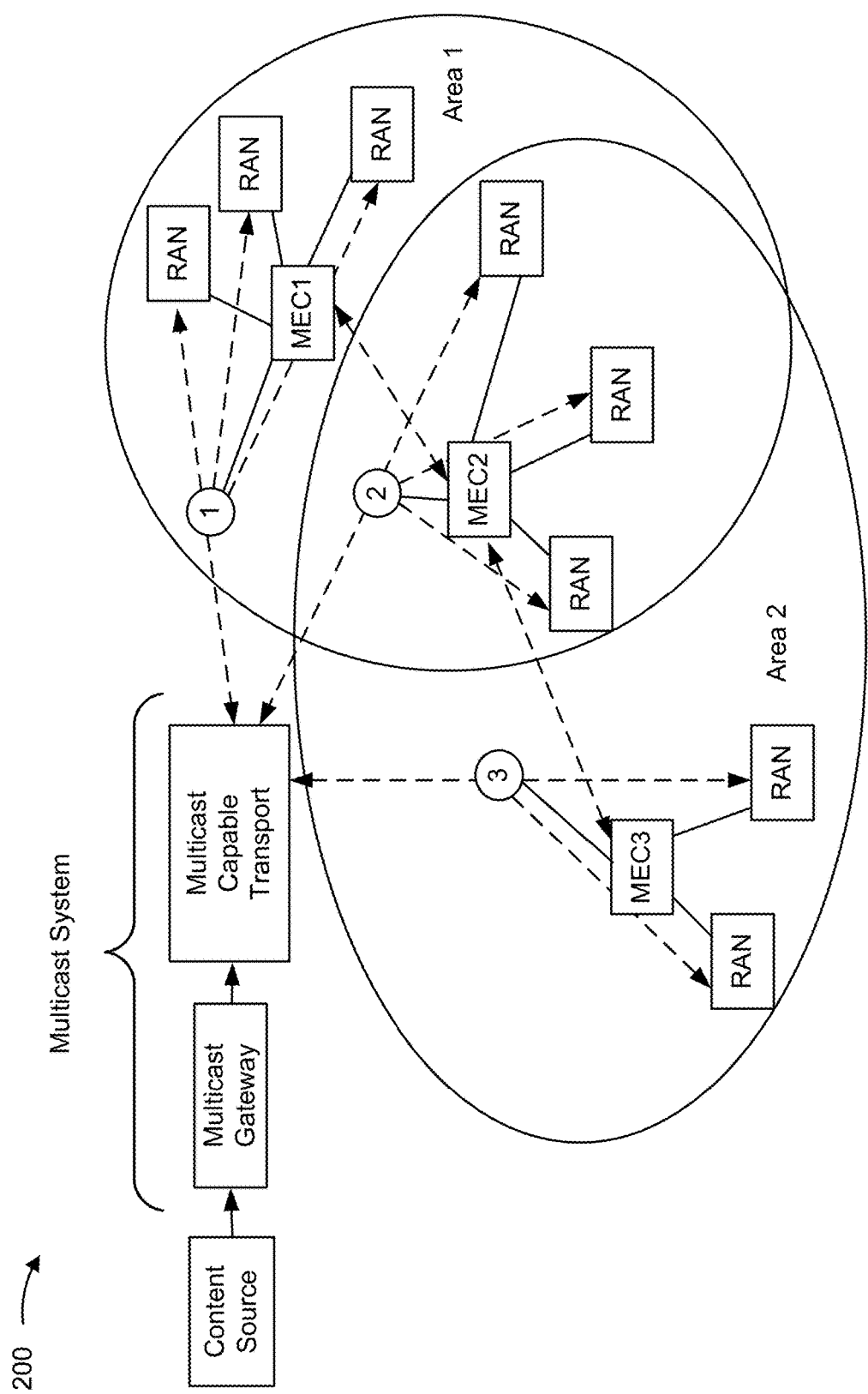
FIG. 2 is a diagram of an example implementation described herein.

FIG. 2 is a diagram of an example implementation 200 described herein. Example implementation 200 includes an example multicast system that includes a multicast gateway and a multicast capable transport and repeater nodes (labeled as "1," "2," and "3" and referred to herein collectively as "the repeater nodes"), a MEC platform that includes a plurality of MEC nodes (labeled as "MEC1," "MEC2," "MEC3" and referred to herein collectively as "the MEC nodes"), and a plurality of RANRANs (e.g., each of which may include one or more base stations). The multicast gateway may correspond to an entry node of a provider network (e.g., the entry node (Node E) of example implementation 100), and the multicast capable transport may include one or more devices and/or nodes of a provider network (e.g., the provider network of example implementation 100) configured to provide multicast routing paths through a provider network.

As shown in FIG. 2, the first repeater node (1) and the second repeater node (2) may serve a first area (shown as "Area 1"), and the second repeater node (2) and a third repeater node (3) may serve a second area (shown as "Area 2"). Moreover, as shown, each of the repeater nodes may be associated with a MEC node. For example, a first MEC node (MEC1) may be configured to monitor characteristics (e.g., resource schedules, performance, available bandwidth, and/or the like) of the first repeater node and the RANs coupled to the first repeater node, a second MEC node (MEC2) may be configured to monitor characteristics of the second repeater node and the RANs coupled to the second repeater node, and a third MEC node (MEC3) may be configured to monitor characteristics of the third repeater node and the RANs coupled to the third repeater node. Additionally, or alternatively, the MEC nodes may be configured to control the repeater nodes and the RANs that are associated with the respective repeater nodes. As described herein, the MEC nodes may be configured to determine respective latencies associated with the repeater nodes and/or the RANs to permit the MEC nodes to determine whether the respective latencies (e.g., latencies of providing a content stream during a particular time period as described herein) associated with the RANs in the first area and the second area are within a threshold range of a requested latency (and/or satisfy a requested relative latency).

In example implementation 200, if the first area and the second area are included within a request to provide a content stream with a requested relative latency (e.g., so that all RANs receive a same content of a content stream during a same threshold time period), the MEC nodes may coordinate to determine whether the RANs of example implementation 200 can provide the content stream with the requested latency to both the first area and the second area. In one example, if all determined latencies associated with the RANs are determined to be within a requested latency, the MEC nodes may determine that the content stream can be provided to both areas with relative latency.

In another example, based on latencies calculated for the RANs, the MEC nodes may determine that the content stream can be provided with a first relative latency to the first area and a second relative latency to the second area. For example, due to the distance between the RANs associated with the first repeater node and the RANs associated with the third repeater node, the MEC nodes may determine that the same content associated with a content stream cannot be provided with the requested relative latency to both the RANs coupled with the first repeater node and the RANs coupled with the second repeater node. However, the content stream can be provided with the first relative latency to the RANs associated with both the first repeater node and the second repeater node or with the second requested latency to the RANs associated with the second repeater node and the third repeater node. In such cases, the MEC nodes may communicate with the content source that the requested relative latency can only be achieved for the first area or the second area. Additionally, or alternatively, the MEC nodes may communicate latency information associated with providing the content stream to all RANs of example implementation 200 so that the content stream can be provided to all areas, but with a different latency (e.g., a determined maximum latency) than what was requested. Furthermore, the MEC nodes may coordinate to determine terms of a service level agreement for providing the content stream to the areas in a manner other than requested.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example implementation 200 may perform one or more functions described as being performed by another set of devices of example implementation 200.

In this way, a stream management platform (e.g., configured using one or more MEC nodes) may determine whether a provider network can provide a content stream to an area with relative latency and/or provision a provider network to multicast the content stream to the area with relative latency. In this way, the stream management platform may enhance a user experience associated with accessing a content stream and conserve resources (e.g., computing resources and/or network resources that may otherwise be wasted when broadcasting a content stream) associated with the provider network providing the content stream to the area with relative latency.

Figure 3:
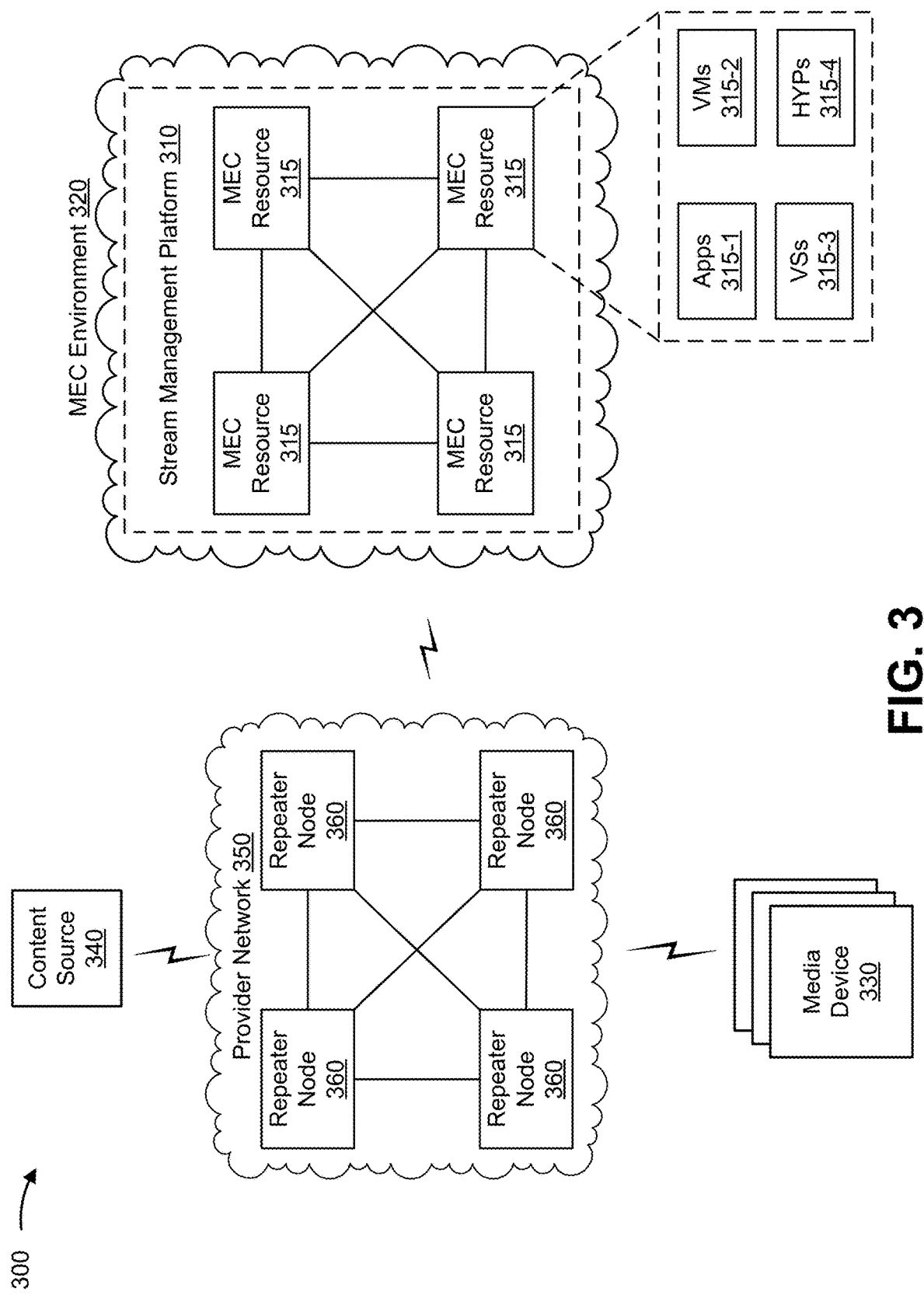
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a stream management platform 310, a MEC resource 315, a MEC environment 320, one or more media devices 330 (referred to herein individually as media device 330 or collectively as media devices 330), a content source 340, a provider network 350, and one or more repeater nodes 360 (referred to herein individually as repeater node 360 or collectively as repeater nodes 360). Devices of environment 300 may interconnect via wired connections, wireless connections, or a combination of wired and wireless connections.

Stream management platform 310 includes one or more computing resources assigned to enable and/or manage multicasting of a content stream via provider network 350. For example, stream management platform 310 may be a platform implemented by MEC environment 320 that may receive a request to provide, via a network, a content stream to an area within a requested latency, determine an entry node of the network that is to receive the content stream from a content source, identify a plurality of transmission nodes associated with the area, determine respective latencies associated with multicasting the content stream from the entry node to the plurality of transmission nodes, determine whether the respective latencies satisfy the requested latency, and perform, based on whether the respective latencies satisfy the requested latency, an action associated with the content stream according to the respective latencies. In some implementations, stream management platform 310 is implemented by computing resources 315 of MEC environment 320.

Stream management platform 310 may include a server device or a group of server devices. In some implementations, stream management platform 310 may be hosted in MEC environment 320. Notably, while implementations described herein may describe stream management platform 310 as being hosted in MEC environment 320, in some implementations, stream management platform 310 may be non-cloud-based or may be partially cloud-based.

MEC environment 320 includes an environment that delivers computing as a service, whereby shared resources, services, and/or the like may be provided to enable and/or manage multicasting of a content stream, as described herein. MEC environment 320 may provide computation, software, data access, storage, and/or other services that do not require end-user knowledge of a physical location and configuration of a system and/or a device that delivers the services. As shown, MEC environment 320 may include stream management platform 310 and MEC resource 315. In some implementations, MEC environment may be an environment of provider network 350.

MEC resource 315 includes one or more personal computers, workstation computers, server devices, or another type of computation and/or communication device. In some implementations, MEC resource 315 may host stream management platform 310. The cloud resources may include compute instances executing in MEC resource 315, storage devices provided in MEC resource 315, data transfer devices provided by MEC resource 315, and/or the like. In some implementations, MEC resource 315 may communicate with other computing resources 315 via wired connections, wireless connections, or a combination of wired and wireless connections.

As further shown in FIG. 3, MEC resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by media device 330. Application 315-1 may eliminate a need to install and execute the software applications on media device 330. For example, application 315-1 may include software associated with stream management platform 310 and/or any other software capable of being provided via MEC environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program and may support a single process. In some implementations, virtual machine 315-2 may execute on behalf of a user (e.g., media device 330), and may manage infrastructure of MEC environment 320, such as data management, synchronization, or long-duration data transfers.

Virtualized storage 315-3 includes one or more storage systems and/or one or more devices that use virtualization techniques within the storage systems or devices of MEC resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as MEC resource 315. Hypervisor 315-4 may present a virtual operating platform to the "guest operating systems" and may manage the execution of the guest operating systems. Multiple instances of a variety of operating systems may share virtualized hardware resources.

Media device 330 includes one or more devices capable of receiving, generating, storing, processing, and/or accessing a content stream, as described herein. For example, media device 330 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), a set-top box, a television (e.g., a smart television) or a similar type of device.

Content source 340 includes one or more devices for generating, processing, formatting, distributing, and/or providing a content stream. For example, content source 340 may include one or more content capture devices (e.g., cameras, microphones, user input components, sensors, and/or the like) and/or computing devices to control the capture devices to capture the content, generate data associated with the content, and provide or stream the data as a content stream. As described herein, content source 340 may be associated with an entity, such as a media company, an entertainment company, a news organization, and/or the like.

Provider network 350 includes one or more wired and/or wireless networks. For example, provider network 350 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Repeater node 360 includes may include one or more network devices for providing, processing, routing, and/or multicasting a content stream as described herein. For example, repeater node 360 may include a multicast repeater a firewall, a router, a gateway, a switch, a hub, a bridge, a reverse proxy, a server (e.g., a proxy server), a security device, an intrusion detection device, a load balancer, a base station, an access point, and/or the like. Repeater node 360 may be included within and/or associated with a RAN. In some implementations, repeater node 360 may be included within, controlled by, and/or be associated with MEC resource 315.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
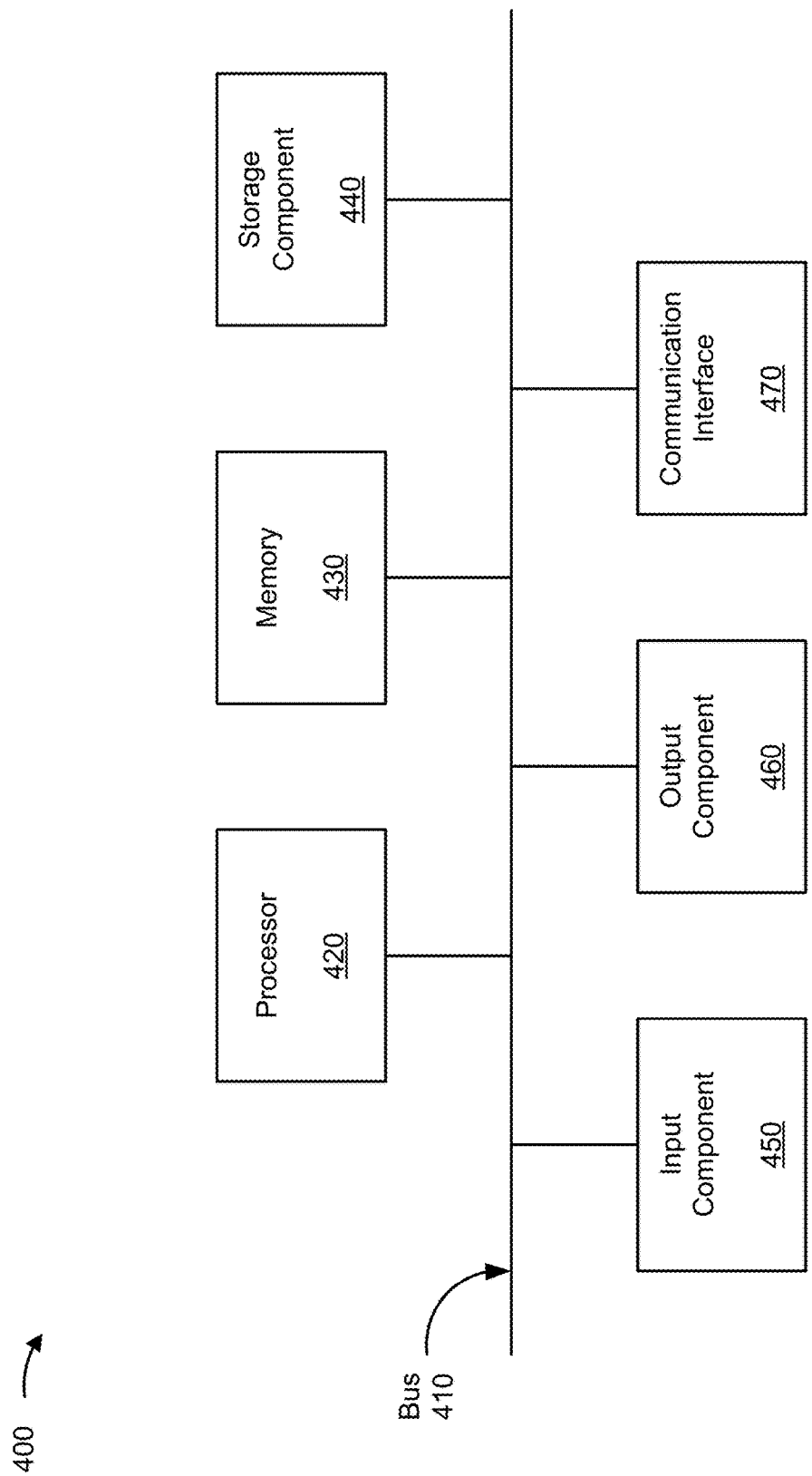
FIG. 4 is a diagram of example components of one or more devices of FIG. 3.

FIG. 4 is a diagram of example components of a device 400. Device 400 may correspond stream management platform 310, MEC resource 315, media device 330, content source 340, and/or repeater nodes 360. In some implementations, stream management platform 310, MEC resource 315, media device 330, content source 340, and/or repeater nodes 360 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
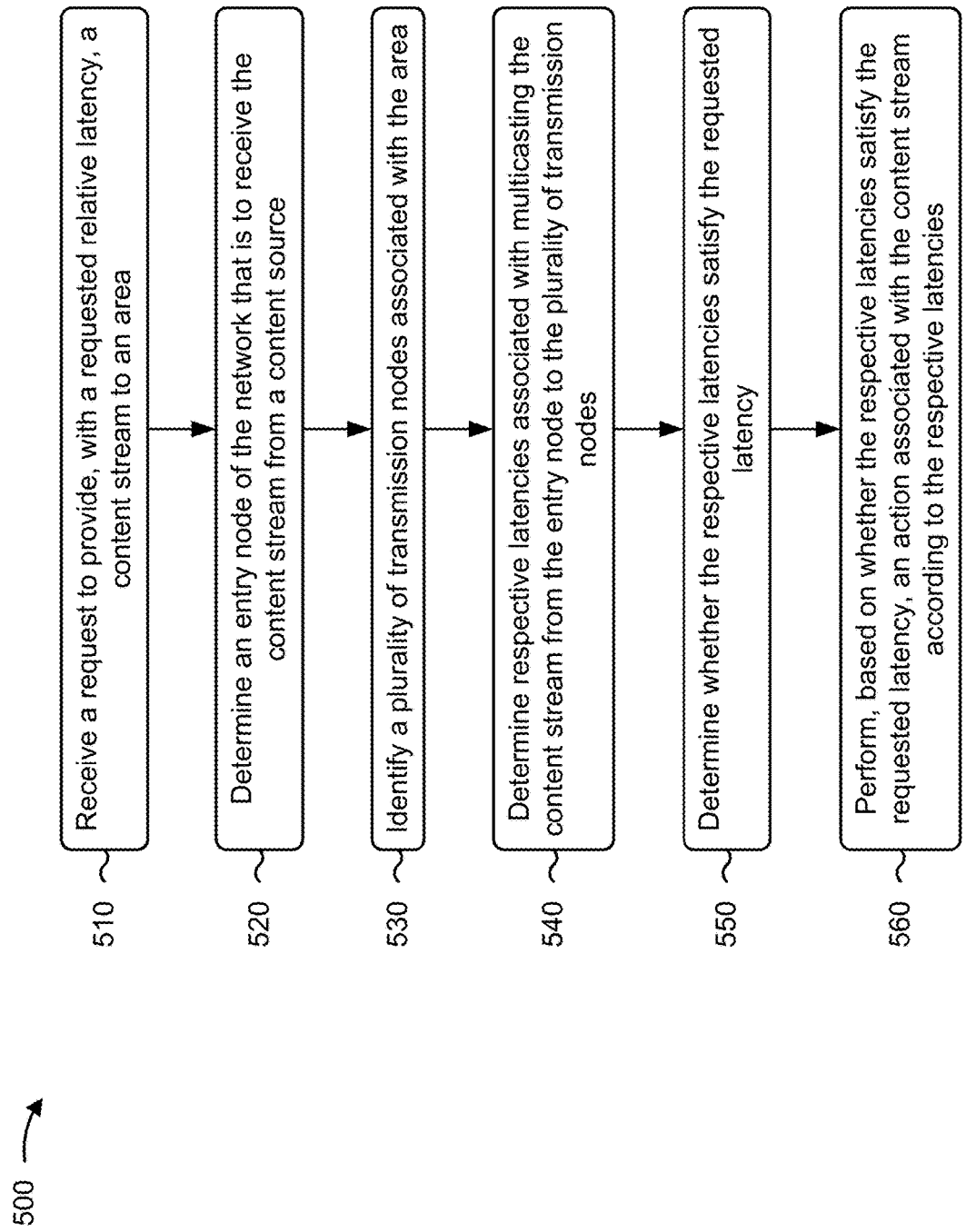
FIG. 5 is a flowchart of an example process for content stream multicasting with relative latency for media devices.

FIG. 5 is a flowchart of an example process 500 for content stream multicasting with relative latency for media devices. In some implementations, one or more process blocks of FIG. 5 may be performed by a streaming management platform (e.g., streaming management platform 310). In some implementations, one or more process blocks of FIG. 5 may be performed by another device or a group of devices separate from or including the streaming management platform, such as a computing resource (e.g., MEC resource 315), a media device (e.g., media device 330), a content source (e.g., content source 340), and a repeater node (e.g., repeater node 36.0), and/or the like.

As shown in FIG. 5, process 500 may include receiving a request to provide, with a requested relative latency, a content stream to an area (block 510). For example, the stream management platform (e.g., using processor 420, memory 430, storage component 440, input component 450, output component 460, communication interface 470 and/or the like) may receive a request to provide a content stream to an area, as described above. In some implementations, the request indicates a requested latency associated with providing the content stream to the area.

As further shown in FIG. 5, process 500 may include determining an entry node of a network that is to receive the content stream from a content source (block 520). For example, the stream management platform (e.g., using processor 420, memory 430, storage component 440, input component 450, output component 460, communication interface 470 and/or the like) may determine an entry node of the network that is to receive the content stream from a content source, as described above.

In some implementations, the entry node is determined based on a location of the content source and a location of the entry node. For example, the stream management platform may determine the entry node by identifying a location of the content source, identifying a node of the network that is nearest the location, and determining that the node of the network that is nearest the location is the entry node.

As further shown in FIG. 5, process 500 may include identifying a plurality of transmission nodes associated with the area (block 530). For example, the stream management platform (e.g., using processor 420, memory 430, storage component 440, input component 450, output component 460, communication interface 470 and/or the like) may identify a plurality of transmission nodes associated with the area, as described above.

In some implementations, the plurality of transmission nodes are determined based on respective locations of the plurality of transmission nodes and location information associated with the area. For example, the stream management platform may identify the plurality of transmission nodes by determining location information associated with the area and identifying the plurality of transmission nodes based on the plurality of transmission nodes being capable of transmitting the content stream to a location identified by the location information.

As further shown in FIG. 5, process 500 may include determining respective latencies associated with multicasting the content stream from the entry node to the plurality of transmission nodes (block 540). For example, the stream management platform (e.g., using processor 420, memory 430, storage component 440, input component 450, output component 460, communication interface 470 and/or the like) may determine respective latencies associated with multicasting the content stream from the entry node to the plurality of transmission nodes, as described above.

In some implementations, process 500 includes determining a bandwidth requirement associated with providing the content stream; determining respective routing paths between the entry node and the plurality of transmission nodes that have bandwidth to satisfy the bandwidth requirement; and determining the respective latencies based on corresponding lengths of the respective routing paths. Accordingly, the respective latencies may be determined based on the corresponding lengths of respective routing paths between the entry node and the plurality of transmission nodes and/or corresponding available bandwidths of repeater nodes of the respective routing paths. For example, the stream management platform may determine the respective latencies by determining a bandwidth requirement associated with providing the content stream, determining respective routing paths between the entry node and the plurality of transmission nodes that have bandwidth to satisfy the bandwidth requirement, and determining the respective latencies based on corresponding lengths of the respective routing paths.

As further shown in FIG. 5, process 500 may include determining whether the respective latencies satisfy the requested latency (block 550). For example, the stream management platform (e.g., using processor 420, memory 430, storage component 440, input component 450, output component 460, communication interface 470 and/or the like) may determine whether the respective latencies satisfy the requested latency, as described above. In some implementations, based on determining that the respective latencies satisfy the requested latency, the stream management platform may determine a maximum latency of the respective latencies.

As further shown in FIG. 5, process 500 may include performing, based on whether the respective latencies satisfy the requested latency, an action associated with the content stream according to the respective latencies (block 560). For example, the stream management platform (e.g., using processor 420, memory 430, storage component 440, input component 450, output component 460, communication interface 470 and/or the like) may perform, based on whether the respective latencies satisfy the requested latency, an action associated with the content stream according to the respective latencies, as described above.

For example, the stream management platform may provision the network to provide the content stream. In some implementations, the plurality of transmission nodes are provisioned to transmit the content stream as the content stream is received from multicast repeaters of the network. Additionally, or alternatively, the stream management platform may provision the network by configuring repeater nodes of the network to establish routing paths between the entry node and the plurality of transmission nodes, configuring the repeater nodes and the plurality of transmission nodes to provide the content stream to the plurality of media devices within a same time period, and causing the content stream to be provided, via the network, to the plurality of media devices as the content stream is received from the content source. In some implementations, the stream management platform may provision the network to provide the content stream in association with the maximum latency of the respective latencies to permit the plurality of media devices to receive the same content of the content stream at relatively the same time. In some implementations, the network is provisioned to multicast the content stream to the plurality of devices by configuring the network to provide individual streams of the content stream through one or more route paths.

In some implementations, the stream management platform may determine terms of a service level agreement (e.g., prior to provisioning the network) based on one or more parameters associated with providing the content stream and provide the terms of the service level agreement to an entity associated with the content source. In some implementations, the network is provisioned based on a response indicating that the entity accepts the terms of the service level agreement.

According to some implementations, after provisioning the network and receiving the content stream, the stream management platform may monitor the plurality of transmission nodes as the content stream is provided to the plurality of media devices, determine a transmission type associated with one transmission node of the plurality of transmission nodes based on a quantity of a set of media devices, of the plurality of media devices, that are receiving the content stream from the one transmission node, and store or indicate the transmission type in association with a service level agreement associated with providing the content stream via the network. In some implementations, the content stream includes content associated with a live event, and when the requested latencies are determined to satisfy the requested latency, a same set of content associated with the live event can be received by the plurality of media devices at substantially a same time within the requested latency.

In some implementations, when one or more of the respective latencies do not satisfy the requested latency, the stream management platform may determine a maximum latency of the respective latencies and provide information that identifies the maximum latency to an entity associated with the content source to permit the entity to indicate whether the network is to be provisioned to provide the content stream according to the maximum latency. Additionally, or alternatively, the stream management platform may provide information that identifies the maximum latency to an entity associated with the content source to permit the entity to indicate whether the network is to be provisioned to provide the content stream according to the maximum latency.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a content source, a request to provide a content stream from the content source to an area,
      wherein the request to provide the content stream to the area indicates a requested latency associated with providing the content stream to the area;
   receiving, by the device and from the content source, a request to determine whether a provider network associated with the device is capable of providing content of the content stream to a plurality of media devices in the area within the requested latency;
   determining, by the device and based on receiving the request to determine whether the provider network associated with the device is capable of providing content of the content stream to the plurality of media devices within the requested latency, an entry node of a network that is to receive the content stream;
   identifying, by the device, a plurality of transmission nodes associated with the area;
   determining, by the device, respective latencies associated with multicasting the content stream from the entry node to the plurality of transmission nodes;
   determining, by the device, that the respective latencies satisfy the requested latency;
   determining, by the device and based on determining that the respective latencies satisfy the requested latency, a maximum latency of the respective latencies; and
   provisioning, by the device, the network to provide the content stream in association with the maximum latency to permit the plurality of media devices to receive, within a tolerance or threshold time period, a same content of the content stream.

2. The method of claim 1, wherein determining the entry node comprises:
   identifying a location of the content source;
   identifying a node of the network that provides a least latency from the location; and
   determining that the node of the network that provides the least latency from the location is the entry node.

3. The method of claim 1, wherein identifying the plurality of transmission nodes comprises:
   determining location information associated with the area; and
   identifying the plurality of transmission nodes based on the plurality of transmission nodes being capable of transmitting the content stream to a location identified by the location information.

4. The method of claim 1, wherein determining the respective latencies comprises:
   determining a bandwidth requirement associated with providing the content stream;
   determining respective routing paths between the entry node and the plurality of transmission nodes that have bandwidth to satisfy the bandwidth requirement; and
   determining the respective latencies based on corresponding lengths of the respective routing paths.

5. The method of claim 1, wherein, provisioning the network comprises:
   configuring a repeater node of the network to establish routing paths between the entry node and the plurality of transmission nodes;
   configuring the repeater node and the plurality of transmission nodes to provide the content stream to the plurality of media devices within a same time period; and
   causing the content stream to be provided, via the network, to the plurality of media devices as the content stream is received from the content source.

6. The method of claim 1, wherein the network is provisioned to multicast the content stream to the plurality of media devices by configuring the network to provide individual streams of the content stream through one or more route paths.

7. The method of claim 1, wherein the plurality of transmission nodes are provisioned to transmit the content stream as the content stream is received from a multicast repeater of the network.

8. The method of claim 1, further comprising:
   monitoring the plurality of transmission nodes as the content stream is provided to the plurality of media devices;
   determining a transmission type associated with one transmission node of the plurality of transmission nodes based on a quantity of a set of media devices, of the plurality of media devices, that are receiving the content stream from the one transmission node; and storing or indicating the transmission type in association with a service level agreement associated with providing the content stream via the network.

9. A device, comprising:
one or more memories; and
one or more processors coupled to the one or more memories, configured to:
  receive, from a content source, a request to provide a content stream to an area,
    wherein the request to provide the content stream to the area indicates a requested latency associated with providing the content stream to the area;
  receive, from the content source, a request to determine whether a provider network associated with the device is capable of providing content of the content stream to a plurality of media devices in the area within the requested latency;
  determine, based on receiving the request to determine whether the provider network associated with the device is capable of providing content of the content stream to the plurality of media devices within the requested latency, an entry node of a network that is to receive the content stream from the content source,
    wherein the entry node is determined based on a location of the content source and a location of the entry node;
  identify a plurality of transmission nodes associated with the area,
    wherein the plurality of transmission nodes are determined based on respective locations of the plurality of transmission nodes and location information associated with the area;
  determine respective latencies associated with multicasting the content stream from the entry node to the plurality of transmission nodes,
    wherein the respective latencies are determined based on at least one of:
      corresponding lengths of respective routing paths between the entry node and the plurality of transmission nodes, or
      corresponding available bandwidths of repeater nodes of the respective routing paths;
  determine whether the respective latencies satisfy the requested latency; and
  perform, based on whether the respective latencies satisfy the requested latency, an action associated with providing the content stream.

10. The device of claim 9, wherein the one or more processors, when determining the respective latencies, are configured to:
  determine a bandwidth requirement associated with providing the content stream; and
  determine that the respective routing paths have bandwidth to satisfy the bandwidth requirement.

11. The device of claim 9, wherein the respective routing paths for the plurality of transmission nodes are selected based on the respective routing paths having lowest latencies between the entry node and corresponding transmission nodes of the plurality of transmission nodes.

12. The device of claim 9, wherein, when the respective latencies satisfy the requested latency, the one or more processors, when performing the action, are configured to:
  provision the network to provide the content stream between the entry node and the plurality of transmission nodes;
  configure the plurality of transmission nodes to provide the content stream to the plurality of media devices within a same threshold time period; and
  provide, via the network, the content stream to the plurality of media devices as the content stream is received from the content source.

13. The device of claim 12, wherein the one or more processors, when performing the action, are configured to:
  monitor the plurality of transmission nodes as the content stream is provided to the plurality of media devices;
  determine a transmission type associated with one transmission node of the plurality of transmission nodes based on a quantity of a set of media devices, of the plurality of media devices, that are receiving the content stream from the one transmission node; and
  store or indicate the transmission type in association with a service level agreement associated with providing the content stream via the network.

14. The device of claim 9, wherein, when the respective latencies satisfy the requested latency, the one or more processors, when performing the action, are configured to:
  determine terms of a service level agreement based on at least one of:
    the requested latency,
    a bandwidth requirement associated with providing the content stream,
    a duration associated with providing the content stream,
    a distance between the content source and the area,
    a distance between the entry node and one or more of the plurality of transmission nodes, or
    a transmission type associated with providing the content stream from the plurality of transmission nodes; and
  provide the terms of the service level agreement to an entity associated with the content source.

15. A non-transitory computer-readable medium storing instructions, the instructions comprising:
  one or more instructions that, when executed by one or more processors, cause the one or more processors to:
    receive, from a content source, a request to provide a content stream to an area,
      wherein the request to provide the content stream to the area indicates a requested latency associated with providing the content stream to the area;
    receive, from the content source, a request to determine whether a provider network associated with the one or more processors is capable of providing content of the content stream to a plurality of media devices in the area within the requested latency;
    determine, based on receiving the request to determine whether the provider network associated with the device is capable of providing content of the content stream to the plurality of media devices within the requested latency, an entry node of a network that is to receive the content stream from the content source;
    identify a plurality of transmission nodes associated with the area;
    determine respective latencies associated with multicasting the content stream from the entry node to the plurality of transmission nodes;
    determine whether the respective latencies satisfy the requested latency; and perform, based on whether the respective latencies satisfy the requested latency, an action associated with the content stream according to the respective latencies.

16. The non-transitory computer-readable medium of claim 15, wherein the one or more instructions, that cause the one or more processors to determine the respective latencies, cause the one or more processors to:
determine a bandwidth requirement associated with providing the content stream;
determine respective routing paths between the entry node and the plurality of transmission nodes that have bandwidth to satisfy the bandwidth requirement; and
determine the respective latencies based on corresponding lengths of the respective routing paths.

17. The non-transitory computer-readable medium of claim 15, wherein the content stream includes content associated with a live event, and
wherein, when the requested latencies are determined to satisfy the requested latency, a same set of content associated with the live event can be received by the plurality of media devices at substantially a same time within the requested latency.

18. The non-transitory computer-readable medium of claim 15, wherein, when the respective latencies satisfy the requested latency, the one or more instructions, that cause the one or more processors to perform the action, cause the one or more processors to:
determine terms of a service level agreement based on one or more parameters associated with providing the content stream via the network; and
provide the terms of the service level agreement to an entity associated with the content source.

19. The non-transitory computer-readable medium of claim 15, wherein, when one or more of the respective latencies do not satisfy the requested latency, the one or more instructions, that cause the one or more processors to perform the action, cause the one or more processors to:
determine a maximum latency of the respective latencies; and
provide information that identifies the maximum latency to an entity associated with the content source to permit the entity to indicate whether the network is to be provisioned to provide the content stream according to the maximum latency.

20. The non-transitory computer-readable medium of claim 15, wherein, when one or more of the respective latencies do not satisfy the requested latency, the one or more instructions, that cause the one or more processors to perform the action, cause the one or more processors to:
determine a serviceable area associated with the requested latency; and
provide information that identifies the serviceable area to an entity associated with the content source to permit the entity to indicate whether the network is to be provisioned to provide the content stream to the serviceable area.

* * * * *